United States Patent
Spurlock et al.

(10) Patent No.: US 8,392,994 B2
(45) Date of Patent: Mar. 5, 2013

(54) SYSTEM, METHOD AND COMPUTER PROGRAM PRODUCT FOR CONTEXT-DRIVEN BEHAVIORAL HEURISTICS

(75) Inventors: Joel Robert Spurlock, Portland, OR (US); Craig D. Schmugar, Hillsboro, OR (US); Fraser Peter Howard, Chipping Norton (GB)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 13/073,674

(22) Filed: Mar. 28, 2011

(65) Prior Publication Data

US 2011/0179491 A1    Jul. 21, 2011

Related U.S. Application Data

(63) Continuation of application No. 11/036,153, filed on Jan. 14, 2005, now Pat. No. 7,917,955.

(51) Int. Cl.
*G06F 11/00* (2006.01)
*G06F 12/14* (2006.01)
*G06F 12/16* (2006.01)
*G08B 23/00* (2006.01)
*G06F 11/30* (2006.01)

(52) U.S. Cl. .............. 726/24; 713/188; 726/22
(58) Field of Classification Search .............. 726/22–25; 713/188
See application file for complete search history.

(56) References Cited

U.S. PATENT DOCUMENTS

| 5,606,668 | A | 2/1997 | Shwed |
| 5,623,600 | A | 4/1997 | Ji et al. |
| 5,889,943 | A | 3/1999 | Ji et al. |
| 5,956,481 | A | 9/1999 | Walsh et al. |
| 5,964,889 | A | 10/1999 | Nachenberg |
| 5,974,549 | A | 10/1999 | Golan |
| 5,983,348 | A | 11/1999 | Ji |
| 5,987,135 | A | 11/1999 | Johnson et al. |
| 5,987,610 | A | 11/1999 | Franczek et al. |
| 6,073,142 | A | 6/2000 | Geiger et al. |
| 6,123,737 | A | 9/2000 | Sadowsky |
| 6,185,689 | B1 | 2/2001 | Todd et al. |
| 6,219,786 | B1 | 4/2001 | Cunningham et al. |
| 6,266,707 | B1 | 7/2001 | Boden et al. |
| 6,311,277 | B1 | 10/2001 | Takaragi et al. |
| 6,460,050 | B1 | 10/2002 | Pace et al. |
| 6,473,896 | B1 | 10/2002 | Hicken et al. |
| 6,594,686 | B1 | 7/2003 | Edwards et al. |

(Continued)

FOREIGN PATENT DOCUMENTS

| EP | 1357499 | 10/2003 |
| GB | 2432687 | 5/2007 |
| JP | 2005148814 | 6/2005 |
| TW | 439032 | 6/2001 |

(Continued)

OTHER PUBLICATIONS

Russinovich, Mark, "Windows NT System Management: A Collection of Topics" Jun. 1998. 29 Street Press. p. 1-6.

(Continued)

*Primary Examiner* — Christian Laforgia
(74) *Attorney, Agent, or Firm* — Patent Capital Group

(57) ABSTRACT

A system, method and computer program product are provided for detecting unwanted data. A scan for unwanted data is performed to generate results of the scan. A context of the scan is then identified. Further, the presence of unwanted data is conditionally indicated based on both the results of the scan and the context of the scan.

15 Claims, 7 Drawing Sheets

U.S. PATENT DOCUMENTS

| | | | |
|---|---|---|---|
| 6,611,925 | B1 | 8/2003 | Spear |
| 6,779,118 | B1 | 8/2004 | Ikudome et al. |
| 6,785,808 | B2 | 8/2004 | Huntington et al. |
| 6,928,555 | B1 | 8/2005 | Drew |
| 6,954,858 | B1 | 10/2005 | Welborn et al. |
| 6,973,578 | B1 | 12/2005 | McIchionc |
| 7,069,583 | B2* | 6/2006 | Yann et al. .................. 726/4 |
| 7,069,589 | B2* | 6/2006 | Schmall et al. ............. 726/24 |
| 7,080,408 | B1 | 7/2006 | Pak et al. |
| 7,159,149 | B2* | 1/2007 | Spiegel et al. .............. 714/43 |
| 7,216,366 | B1 | 5/2007 | Raz et al. |
| 7,216,367 | B2 | 5/2007 | Szor |
| 7,222,366 | B2* | 5/2007 | Bruton et al. .............. 726/23 |
| 7,266,844 | B2* | 9/2007 | Teblyashkin et al. ....... 726/24 |
| 7,281,268 | B2* | 10/2007 | Hollander et al. .......... 726/22 |
| 7,290,282 | B1 | 10/2007 | Renert et al. |
| 7,350,235 | B2* | 3/2008 | Jordan ........................ 726/24 |
| 7,395,394 | B2 | 7/2008 | Federa et al. |
| 7,415,727 | B1 | 8/2008 | Lowe et al. |
| 7,487,544 | B2* | 2/2009 | Schultz et al. .............. 726/24 |
| 7,502,939 | B2* | 3/2009 | Radatti ...................... 713/188 |
| 7,506,155 | B1 | 3/2009 | Stewart et al. |
| 7,587,759 | B1* | 9/2009 | McArdle et al. ............ 726/22 |
| 7,694,150 | B1* | 4/2010 | Kirby ......................... 713/188 |
| 7,765,593 | B1 | 7/2010 | Lowe et al. |
| 7,814,542 | B1* | 10/2010 | Day ............................ 726/22 |
| 7,917,955 | B1* | 3/2011 | Spurlock et al. ............ 726/24 |
| 2001/0039579 | A1 | 11/2001 | Trcka et al. |
| 2002/0066024 | A1* | 5/2002 | Schmall et al. ............ 713/200 |
| 2002/0091940 | A1 | 7/2002 | Welborn et al. |
| 2002/0157008 | A1* | 10/2002 | Radatti ...................... 713/188 |
| 2003/0023875 | A1 | 1/2003 | Hursey et al. |
| 2003/0061502 | A1* | 3/2003 | Teblyashkin et al. ...... 713/200 |
| 2003/0065926 | A1 | 4/2003 | Schultz et al. |
| 2003/0079145 | A1 | 4/2003 | Kouznetsov et al. |
| 2003/0110391 | A1* | 6/2003 | Wolff et al. ................ 713/200 |
| 2003/0159070 | A1 | 8/2003 | Mayer et al. |
| 2003/0174841 | A1 | 9/2003 | Nault et al. |
| 2004/0003284 | A1 | 1/2004 | Campbell et al. |
| 2004/0015712 | A1 | 1/2004 | Szor |
| 2004/0143749 | A1 | 7/2004 | Tajalli et al. |
| 2004/0168070 | A1 | 8/2004 | Szor |
| 2004/0210640 | A1 | 10/2004 | Chadwick et al. |
| 2005/0005153 | A1 | 1/2005 | Das et al. |
| 2005/0027686 | A1 | 2/2005 | Shipp |
| 2005/0108562 | A1* | 5/2005 | Khazan et al. ............. 713/200 |
| 2005/0120229 | A1 | 6/2005 | Lahti |
| 2005/0132206 | A1 | 6/2005 | Palliyil et al. |
| 2005/0166001 | A1 | 7/2005 | Conover et al. |
| 2005/0183143 | A1 | 8/2005 | Anderholm et al. |
| 2005/0188208 | A1 | 8/2005 | Day et al. |
| 2005/0188272 | A1 | 8/2005 | Bodorin et al. |
| 2005/0240769 | A1 | 10/2005 | Gassoway |
| 2006/0037079 | A1 | 2/2006 | Midgley |
| 2006/0041942 | A1 | 2/2006 | Edwards |
| 2006/0080737 | A1 | 4/2006 | Freeman et al. |
| 2006/0095964 | A1 | 5/2006 | Costea |
| 2006/0095970 | A1* | 5/2006 | Rajagopal et al. .......... 726/25 |
| 2006/0101263 | A1 | 5/2006 | Costea et al. |
| 2006/0101264 | A1 | 5/2006 | Costea et al. |
| 2006/0101282 | A1 | 5/2006 | Costea et al. |
| 2007/0083931 | A1* | 4/2007 | Spiegel et al. .............. 726/24 |
| 2008/0134335 | A1 | 6/2008 | Kameda |
| 2008/0196104 | A1 | 8/2008 | Tuvell et al. |
| 2009/0019388 | A1 | 1/2009 | Zhang et al. |
| 2009/0031162 | A1 | 1/2009 | Bose et al. |
| 2009/0141652 | A1 | 6/2009 | Canright et al. |

FOREIGN PATENT DOCUMENTS

| | | |
|---|---|---|
| WO | WO 00/36503 | 6/2000 |
| WO | WO 01/25953 | 4/2001 |
| WO | WO 02/103498 | 12/2002 |
| WO | WO 03/067810 | 8/2003 |

OTHER PUBLICATIONS

European Search Report in EP Application No. GB0523997.5 mailed on Mar. 30, 2006.

European Search Report in EP Application No. GB0523997.5 mailed on May 24, 2010.

U.S. Appl. No. 11/036,153.

Non-Final Office Action in U.S. Appl. No. 11/036,153 mailed on Jun. 16, 2008.

Response to Non-Final Office Action dated Jun. 16, 2008 in U.S. Appl. No. 11/036,153, filed Sep. 16, 2008.

Final Office Action in U.S. Appl. No. 11/036,153 mailed on Dec. 17, 2008.

Response to Final Office Action dated Dec. 17, 2009 in U.S. Appl. No. 11/036,153, filed Feb. 17, 2009.

Advisory Action in U.S. Appl. No. 11/036,153 mailed on Mar. 12, 2009.

Request for Continued Examination and Amendment in U.S. Appl. No. 11/036,153, filed Apr. 17, 2009.

Non-Final Office Action in U.S. Appl. No. 11/036,153 mailed on May 22, 2009.

Response to Non-Final Office Action dated May 22, 2009 in U.S. Appl. No. 11/036,153, filed Oct. 22, 2009.

Final Office Action in U.S. Appl. No. 11/036,153 mailed on Feb. 26, 2010.

Request for Continued Examination and Amendment in U.S. Appl. No. 11/036,153, filed Jun. 28, 2010.

Non-Final Office Action in U.S. Appl. No. 11/036,153 mailed on Jul. 14, 2010.

Response to Non-Final Office Action dated Jul. 14, 2010 in U.S. Appl. No. 11/036,153, filed Jan. 14, 2010.

Notice of Allowance in in U.S. Appl. No. 11/036,153 mailed on Feb. 7, 2011.

U.S. Appl. No. 11/876,523, filed Jun. 24, 2004.

Non-Final Office Action in U.S. Appl. No. 10/876,523 mailed on Sep. 21, 2005.

Examiner Interview Summary in U.S. Appl. No. 10/876,523 mailed on Oct. 4, 2005.

Response to Non-Final Office Action dated Sep. 21, 2005 in U.S. Appl. No. 10/876,523, filed Dec. 12, 2005.

Final Office Action in U.S. Appl. No. 10/876,523 mailed on Feb. 3, 2006.

Response to Final Office Action dated Feb. 3, 2006 in U.S. Appl. No. 10/876,523, filed Apr. 3, 2006.

Advisory Action in U.S. Appl. No. 10/876,523 mailed on Apr. 12, 2006.

Notice of Appeal in U.S. Appl. No. 10/876,523, filed May 3, 2006.

Appeal Brief in U.S. Appl. No. 10/876,523, filed Jun. 30, 2006.

Examiner's Answer to Appeal Brief in U.S. Appl. No. 10/876,523 mailed on Jan. 11, 2006.

Reply Brief in U.S. Appl. No. 10/876,523, filed Jan. 3, 2007.

BPAI Decision in in U.S. Appl. No. 10/876,523 mailed on Jul. 27, 2007.

Request for Continued Examination and Amendment in U.S. Appl. No. 10/876,523, filed Sep. 27, 2007.

Notice of Allowance in U.S. Appl. No. 10/876,523 mailed on Oct. 30, 2007.

312 Amendment in U.S. Appl. No. 10/876,523 mailed on Jan. 29, 2008.

Response to 312 Amendment in U.S. Appl. No. 10/876,523, filed Mar. 6, 2008.

U.S. Appl. No. 10/876,524, filed Jun. 24, 2004.

Non-Final Office Action in U.S. Appl. No. 10/876,524 mailed on May 10, 2005.

Response to Non-Final Office Action dated May 10, 2005 in U.S. Appl. No. 10/876,524, filed Jun. 3, 2005.

Final Office Action in U.S. Appl. No. 10/876,524 mailed on Sep. 8, 2005.

Response to Final Office Action dated Sep. 8, 2005 in U.S. Appl. No. 10/876,524, filed Oct. 13, 2005.

Non-Final Office Action in U.S. Appl. No. 10/876,524 mailed on Mar. 2, 2006.

Response to Non-Final Office Action dated Mar. 2, 2006 in U.S. Appl. No. 10/876,524, filed May 31, 2006.

Final Office Action in U.S. Appl. No. 10/876,524 mailed on Jun. 15, 2006.

Pre-Brief Conference Request and Notice of Appeal in U.S. Appl. No. 10/876,524, filed Nov. 13, 2006.
Pre-Brief Conference Decision in U.S. Appl. No. 10/876,524 mailed on Dec. 7, 2006.
Non-Final Office Action in U.S. Appl. No. 10/876,524 mailed on Feb. 14, 2007.
Pre-Brief Conference Request and Notice of Appeal in U.S. Appl. No. 10/876,524, filed May 14, 2007.
Pre-Brief Conference Decision in U.S. Appl. No. 10/876,524 mailed on May 24, 2007.
Non-Final Office Action in U.S. Appl. No. 10/876,524 mailed on Sep. 25, 2007.
Response to Non-Final Office Action dated Sep. 25, 2007 in U.S. Appl. No. 10/876,524, filed Jan. 24, 2008.
Final Office Action in U.S. Appl. No. 10/876,524 mailed on Mar. 4, 2009.
Request for Continued Examination and Amendment in Response to Final Office Action dated Apr. 3, 2009 in U.S. Appl. No. 10/876,524, filed Jun. 4, 2009.
Non-Final Office Action in U.S. Appl. No. 10/876,524 mailed on Aug. 26, 2009.
Response to Non-Final Office Action dated Aug. 26, 2009 in U.S. Appl. No. 10/876,524 mailed on Dec. 28, 2009.
Notice of Allowance in U.S. Appl. No. 10/876,524 mailed on Mar. 11, 2010.
Non-Final Office Action in U.S. Appl. No. 11/010,993 mailed on Jan. 7, 2008.
Response to Non-Final Office Action dated Jan. 7, 2008 in U.S. Appl. No. 11/010,993 mailed on Mar. 31, 2008.
Final Office Action in U.S. Appl. No. 11/010,993 mailed on Jul. 14, 2008.
Response to Final Office Action dated Jul. 14, 2008 in U.S. Appl. No. 11/010,993, filed Sep. 15, 2008.
Advisory Action in U.S. Appl. No. 11/010,993 mailed on Sep. 25, 2008.
Request for Continued Examination and Amendment in U.S. Appl. No. 11/010,993, filed Oct. 9, 2008.
Non-Final Office Action in U.S. Appl. No. 11/010,993 mailed on Dec. 26, 2008.
Response to Non-Final Office Action dated Dec. 26, 2008 in U.S. Appl. No. 11/010,993, filed Mar. 26, 2009.
Final Office Action in U.S. Appl. No. 11/010,993 mailed on Aug. 5, 2009.
Response to Final Office Action dated Aug. 5, 2009 in U.S. Appl. No. 11/010,993, filed Oct. 5, 2009.
Advisory Action in U.S. Appl. No. 11/010,993 mailed on Nov. 12, 2009.
Request for Continued Examination and Amendment in U.S. Appl. No. 11/010,993, filed Nov. 25, 2009.
Non-Final Office Action in U.S. Appl. No. 11/010,993 mailed on Dec. 24, 2009.
Response to Non-Final Office Action dated Dec. 24, 2009 in U.S. Appl. No. 11/010,993, filed Mar. 24, 2010.
Final Office Action in U.S. Appl. No. 11/010,993 mailed on Jun. 18, 2010.
Response to Final Office Action dated Jun. 18, 2010 in U.S. Appl. No. 11/010,993, filed Aug. 18, 2010.
Advisory Action in U.S. Appl. No. mailed on Sep. 17, 2010.
Request for Continued Examination and Amendment in U.S. Appl. No. 11/010,993, filed Nov. 17, 2010.
Non-Final Office Action in U.S. Appl. No. 11/010,993 mailed on Jan. 21, 2011.
Response to Non-Final Office Action dated Jan. 21, 2011 in U.S. Appl. No. 11/010,993, filed Apr. 20, 2011.
Final Office Action in U.S. Appl. No. 11/010,993 mailed on Jul. 11, 2011.

* cited by examiner

SYSTEM, METHOD AND COMPUTER PROGRAM PRODUCT FOR CONTEXT-DRIVEN BEHAVIORAL HEURISTICS

RELATED APPLICATION(S)

This application is a continuation (and claims the benefit of priority under 35 U.S.C. §120) of U.S. application Ser. No. 11/036,153, filed Jan. 14, 2005, now U.S. Pat. No. 7,917,955 entitled "SYSTEM, METHOD AND COMPUTER PROGRAM PRODUCT FOR CONTEXT-DRIVEN BEHAVIORAL HEURISTICS," Inventor(s) Joel Robert Spurlock, et al., which relates to U.S. application Ser. No. 10/876,524, filed Jun. 24, 2004. The disclosure of the prior applications is considered part of (and is incorporated by reference in) the disclosure of this application.

FIELD OF THE INVENTION

The present invention relates to unwanted data (i.e. malware, spyware, etc.) detection/prevention systems, and more particularly to detecting/preventing unwanted data (i.e. malware, spyware, etc.) utilizing heuristics.

BACKGROUND OF THE INVENTION

In the space of just a decade, the Internet, because it provides access to information, and the ability to publish information, in revolutionary ways, has emerged from relative obscurity to international prominence. Whereas, in general, an internet is a network of networks, the Internet is a global collection of interconnected local, mid-level, and wide-area networks that use the Internet Protocol (IP) as the network layer protocol. Whereas the Internet embraces many local- and wide-area networks, a given local- or wide-area network may or may not form part of the Internet.

As the Internet and its underlying technologies have become increasingly familiar, attention has become focused on Internet security and computer network security in general. With unprecedented access to information has also come unprecedented opportunities to gain unauthorized access to data, change data, destroy data, make unauthorized use of computer resources, interfere with the intended use of computer resources, etc. These opportunities have been exploited time and time again.

Many techniques have been used to detect unwanted data and the various related malicious functionality resulting therefrom. For example, name identification may be used to detect a threat specifically based on a file signature. Further, generic identification may be used to detect a threat based on malicious family characteristics (e.g. identifying a bagle variant, etc.). Still yet, "false," or "falsing," refers to the detection of a benign file which is not a threat. Heuristics may be used to detect new threats without name or generic identification. Even still, behavioral heuristics may utilize heuristics which, in turn, use a context of malicious operations to improve detection.

Unfortunately, traditional security solutions are, in large, reactive. For example, file signatures are developed after a threat is perceived. There is thus little technology that can effectively detect and remove new unknown threats without significant risk of incorrectly identifying innocent files, etc.

There is thus a need for overcoming these and/or other problems associated with the prior art.

SUMMARY

A system, method and computer program product are provided for detecting unwanted data. A scan for unwanted data is performed to generate results of the scan. A context of the scan is then identified. Further, the presence of unwanted data is conditionally indicated based on both the results of the scan and the context of the scan.

In one embodiment, the scan may involve comparing incoming data, etc. with a plurality of signatures representative of unwanted data. The results may thus indicate whether a match is found. Such signatures may even include heuristic signatures.

To this end, utilization of the context of the scan may permit a wider range of the heuristic signatures, without substantially increasing instances of false detections, etc. Still yet, the results of the scan and the context of the scan may be used in combination to improve a reliability of the detection of the unwanted data.

In another embodiment, the context of the scan may be identified utilizing a state machine and/or may reflect behavior over time. The context of the scan may also involve at least one file and/or process subject to the scan. Further, the context of the scan may include a registry change, network communication, user information, at least one change to at least one file, and/or information on code execution.

As a further option, the context of the scan may be used to determine a persistence of the unwanted data, a propagation of the unwanted data, and/or a stealth aspect of the unwanted data. Still yet, the unwanted data may include malware, spyware, etc.

Yet another security system, method and computer program product are provided for detecting unwanted data. In use, the behavior of data is first monitored and a context is determined based on the monitoring. Then it is determined whether the data includes unwanted data based on the context. As operation continues, the above mentioned acts are repeated, such that additional determinations of whether the data includes unwanted data may be based on each of the contexts identified from the monitoring.

DETAILED DESCRIPTION

Figure 1:
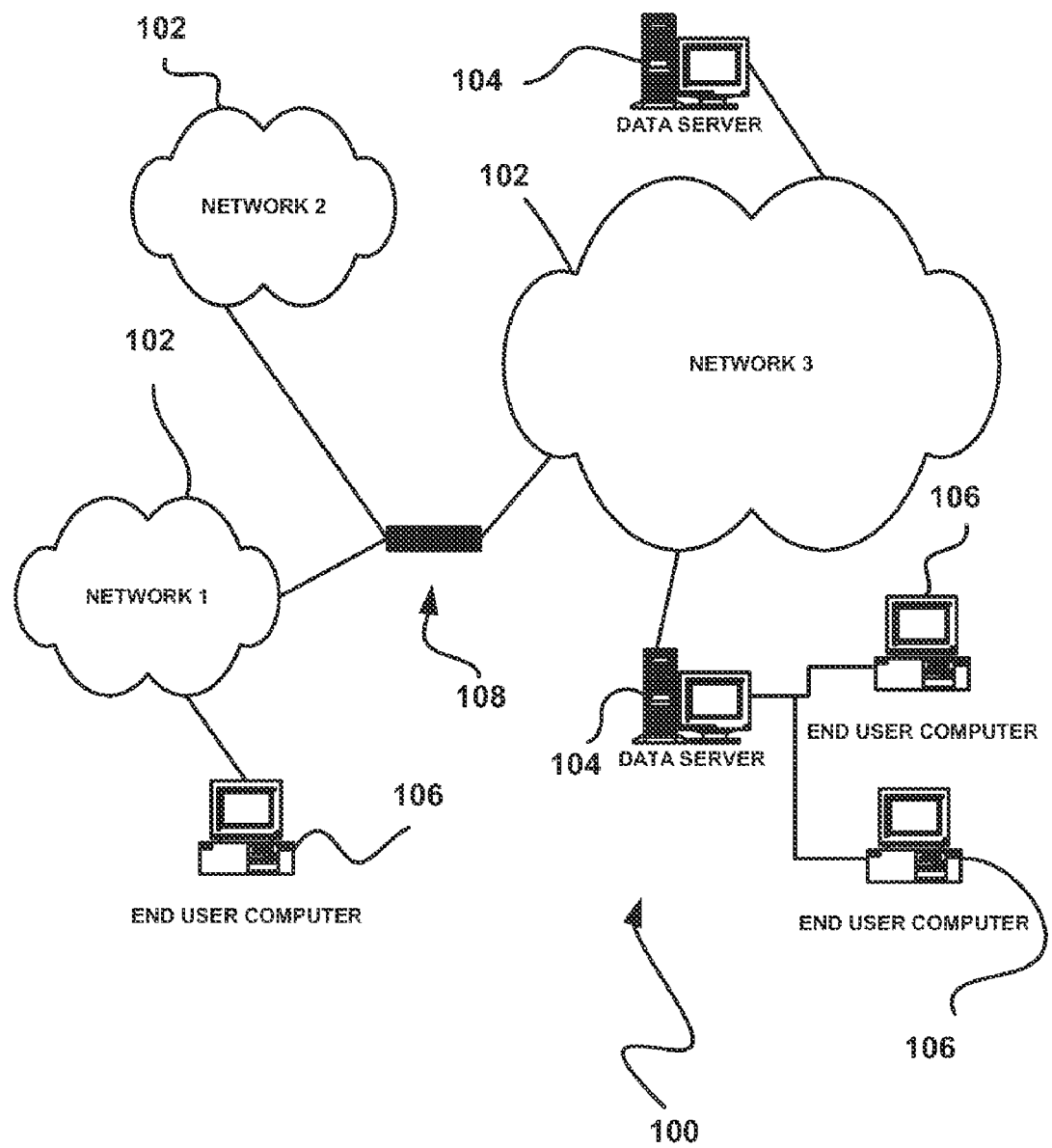
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data server computers 104 which are capable of communicating over the networks 102. Also coupled to the networks 102 and the data server computers 104 is a plurality of end user computers 106. In order to facilitate communication among the networks 102, at least one gateway or router 108 is optionally coupled therebetween.

It should be noted that each of the foregoing network devices in the present network architecture 100, as well as any other unillustrated hardware and/or software, may be equipped with various security features. For example, the various data server computers 104 and/or end user computers 106 may be equipped with security functionality in the form of a scanner, a firewall, intrusion detection/previous system, etc. for purposes that will be set forth hereinafter in greater detail.

Figure 2:
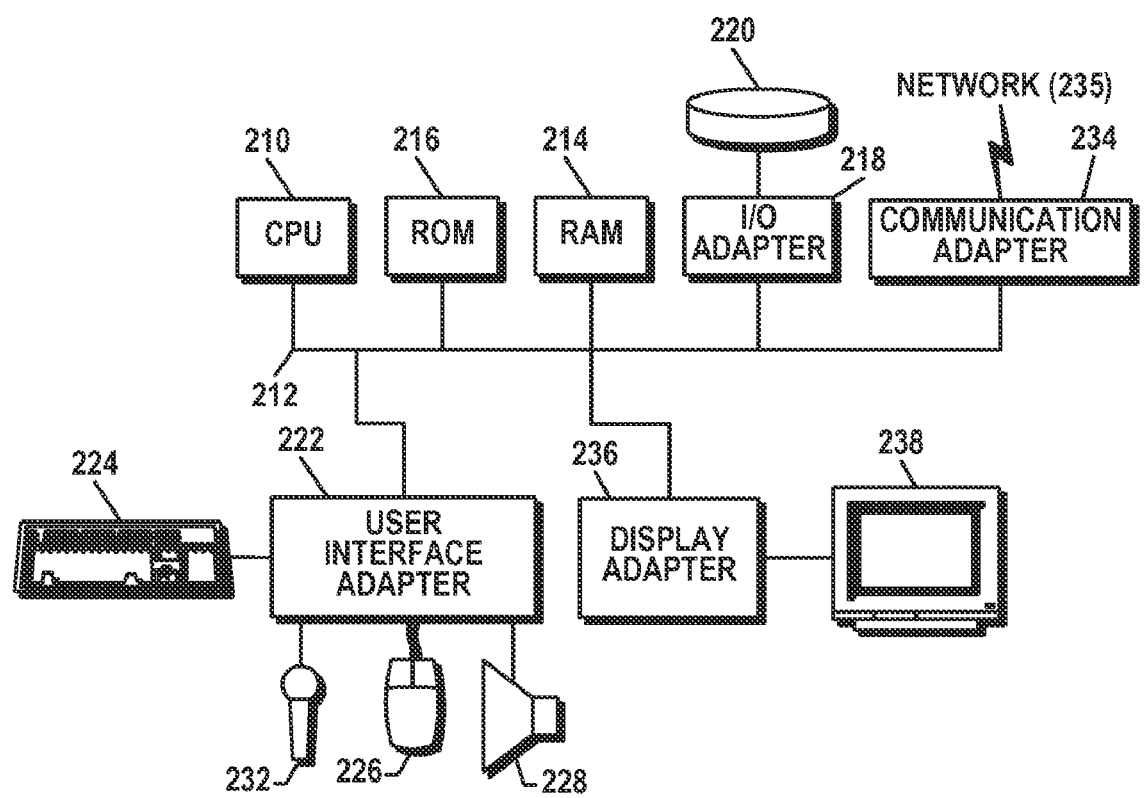
FIG. 2 shows a representative hardware environment that may be associated with the data server computers and/or end user computers of FIG. 1, in accordance with one embodiment.

FIG. 2 shows a representative hardware environment that may be associated with the data server computers 104 and/or end user computers 106 of FIG. 1, in accordance with one embodiment. Such figure illustrates a possible hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Our course, the various embodiments set forth herein may be implemented utilizing hardware, software, or any desired combination thereof. For that matter, any type of logic may be utilized which is capable of implementing the various functionality set forth herein.

Figure 3:
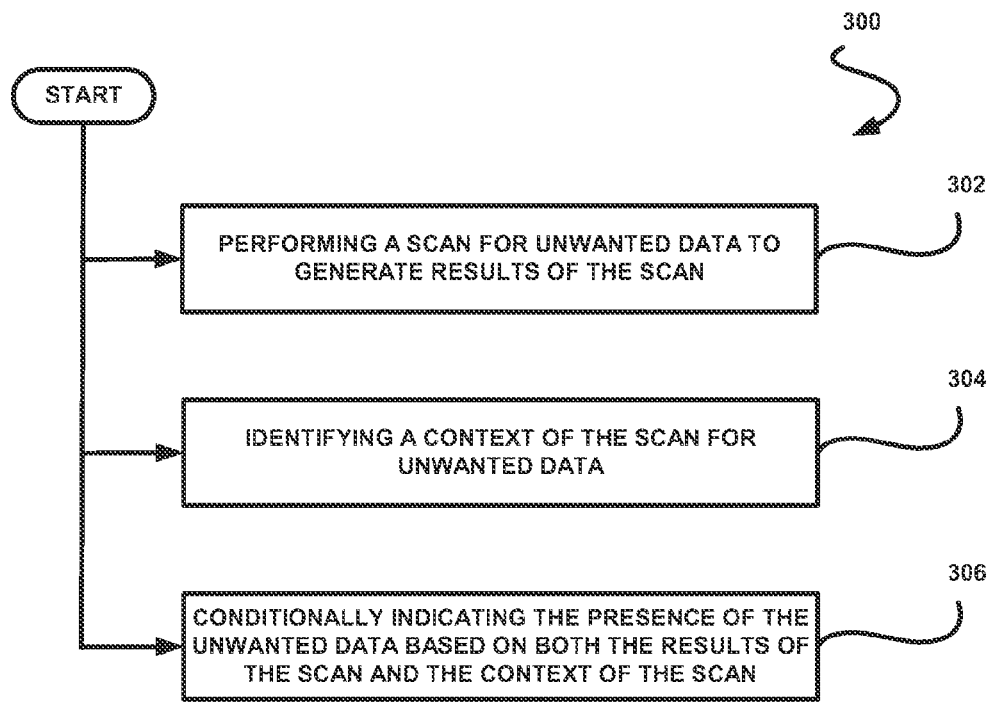
FIG. 3 illustrates a security method for detecting unwanted data, in accordance with one embodiment.

FIG. 3 illustrates a security method 300 for detecting unwanted data, in accordance with one embodiment. As an option, the present method 300 may be implemented in the context of the architecture and environment of FIGS. 1 and/or 2. Of course, however, the security method 300 may be carried out in any desired environment.

As shown, the security method 300 includes a scan for unwanted data to generate results of the scan in operation 302. Unwanted data may include, but is not limited to, data, executable code, non-executable code, unwanted (or even potentially unwanted) programs such as malware, spyware, etc. and/or any other computer and/or network-related entity that is unwanted or potentially unwanted.

In the context of the present description, malware may refer to any programming or files that are developed for the purpose of doing harm to a computer and/or network components. Thus, malware may include, but is not limited to, computer viruses, worms, Trojan horses, etc. Further, a malware family may refer to multiple versions of a file(s) which have similar behavior and classification. Still yet, a variant may refer to individual members of a malware family.

Spyware, while not as malicious as the aforementioned conventional viruses, Trojan horses, etc., may still cause problems for computer users. For example, spyware may be designed to log keystrokes, track which websites a computer user visits, and/or transmit personal information to a third party. In the context of the present description, the term spyware is further deemed to include other related types of similar software such as adware, dialer software, other equivalents, and/or any other software that is less malicious than conventional malware. For example, adware is typically designed to download and display advertisements on a screen of a computer, and can be very intrusive. Dialer software, on the other hand, is designed to redirect a dial-up Internet Service Provider (ISP) connection of a computer to a different, more expensive phone number, in exchange for access to something, typically pornography.

Referring again to FIG. 3, the scan in operation 302 may optionally involve comparing data with a plurality of signatures representative of unwanted data. Such signatures may include, but are not limited to heuristic signatures. The results of the scan in operation 302 may thus indicate whether a match between the signatures and data is found. Of course, in the context of the present description, a scan may refer to any operation that is capable of detecting, at least in part, unwanted data.

The security method 300 also identifies a context of the scan for unwanted data in operation 304. In the present description, such context may include the behavior of files and/or processes over time, or any other contextual information, behavior, surrounding circumstances, conditions, and/or state related to the scan.

Just by way of example, the context may include, but is not limited to, registry changes, network communication, user information, file and/or folder information, processes that act on a file, changes made to a file, code execution, and/or file information and signature detection. In addition, the context may involve processes that open ports, delete pending file renames, copy themselves to startup folders, use specific application program interfaces (API's), write to another process memory area, and any other related processes. Still yet, the context of the scan can be identified by utilization of a state machine, such as anti-virus software. It may also be noted that the identification of the context of the scan for unwanted data can be used to determine a source, persistence, propagation, stealth and/or any other aspect of unwanted data.

Thereafter, the security method 300 conditionally indicates the presence of unwanted data based on both the results of the scan and the context of the scan, as indicated in operation 306. The results of the scan and the context of the scan are used in combination to make the detection of unwanted data more reliable.

To this end, utilization of the context of the scan may permit a wider range of the signatures, without substantially increasing instances of false detections, etc. Still yet, the results of the scan and the context of the scan may be used in combination to improve a reliability of the detection of the unwanted data.

Figure 4:
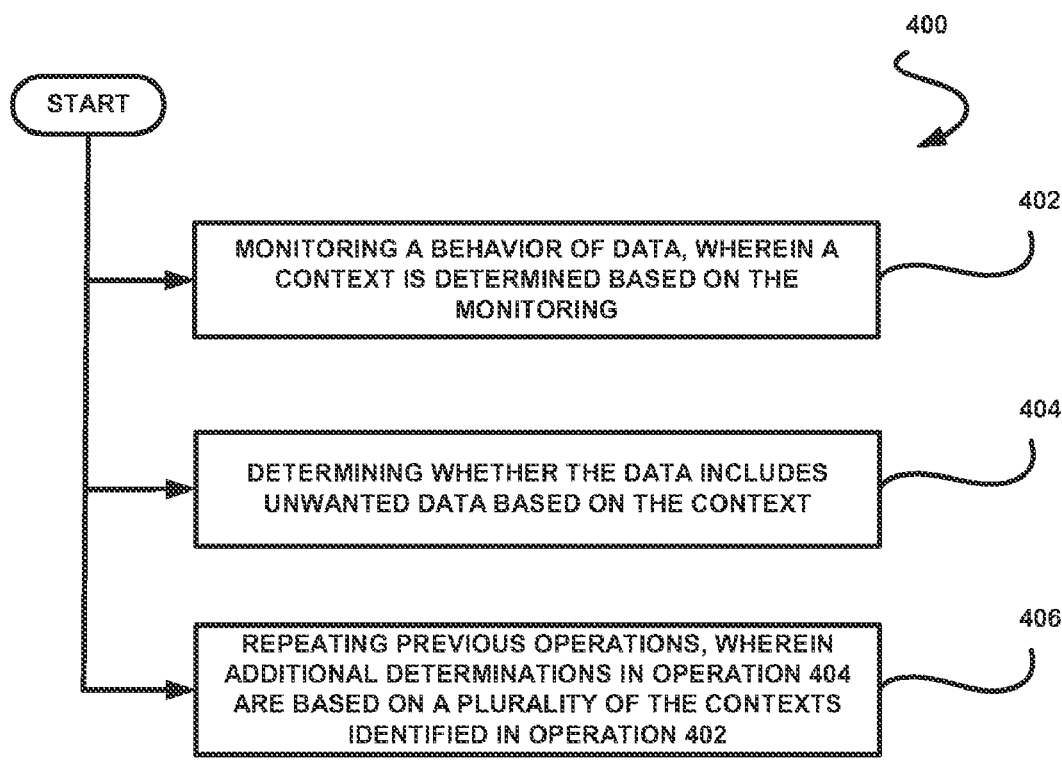
FIG. 4 illustrates a security method for detecting unwanted data, in accordance with another embodiment.

FIG. 4 illustrates a security method 100 for detecting unwanted data, in accordance with another embodiment. As an option, the present security method 100 may be implemented in the context of the architecture, environment and/or context of FIGS. 1, 2 and/or 3. Of course, however, the security method 100 may be carried out in any desired environment and/or context.

The security method 100 for detecting unwanted data includes monitoring the behavior of data, and determining a context based on such monitoring. See operation 102. Strictly as an option, behavioral information that is detected may be given a unique identification (ID) number. In use, such unique ID number may be known by a monitoring component and a monitoring component of any underlying architecture, for reasons that will soon become apparent.

The security method 100 continues by determining whether the data contains unwanted data based on the context, as noted in operation 104. Further, operations 102 and 104 are repeated (as noted in operation 106), such that additional determinations made in operation 104 are based on a plurality of the contexts identified in operation 102. As an option, each of the contexts (previous and present) may be used in all additional determinations made in operation 104.

To this end, the present method 100 is capable of collecting various contexts as each additional monitoring operation takes place. Thus, the method 100 may become "smarter" as the monitoring progresses, thereby improving the detection of unwanted data.

More information on optional details that may or may not be incorporated with the foregoing methods will now be set forth. It should be noted that such details are set forth for illustrative purposes only, and should not be construed as limiting in any manner.

Figure 5A:
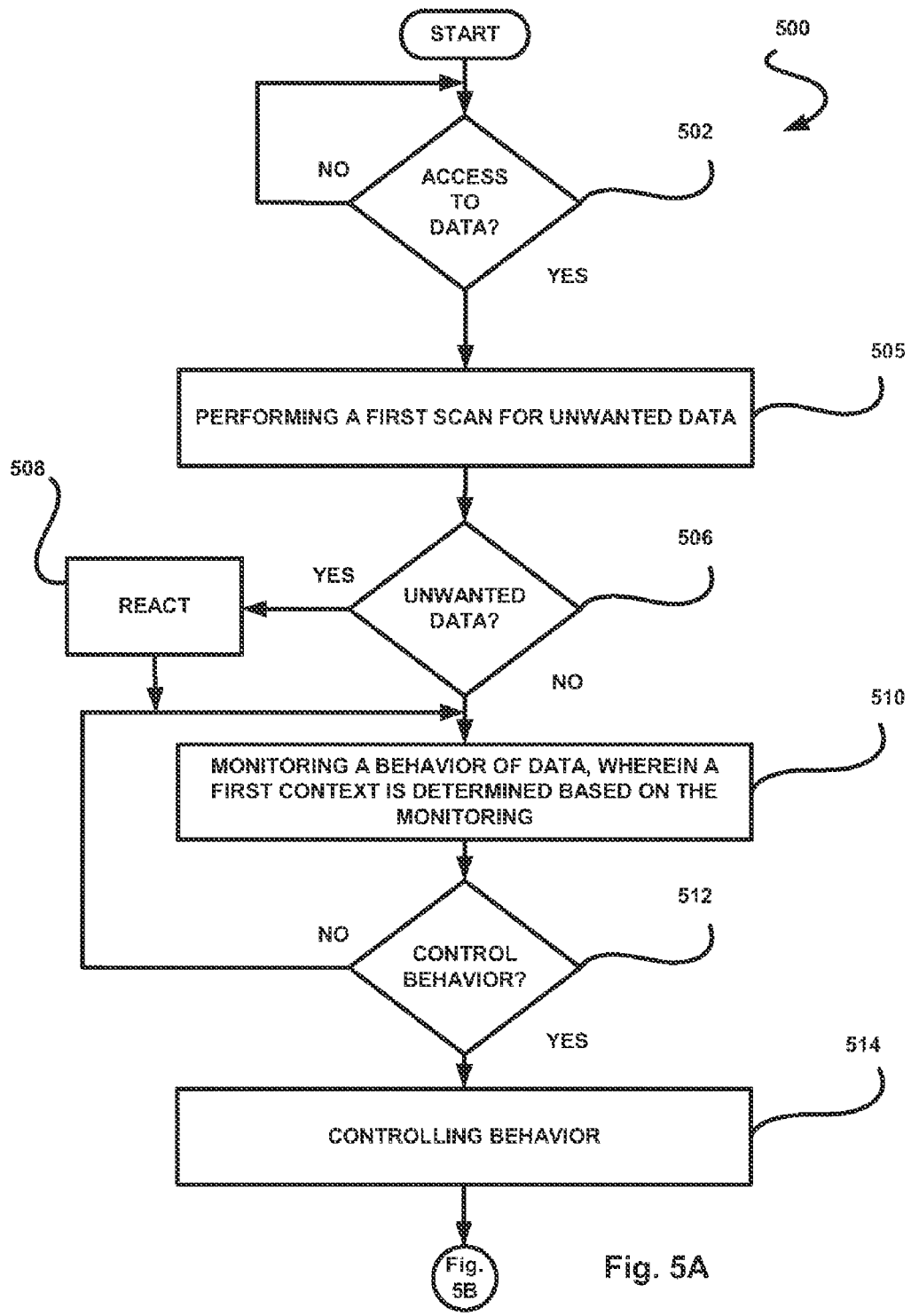
FIGS. 5A-5C illustrate a security method for detecting unwanted data, in accordance with yet another embodiment.
Figure 5B:
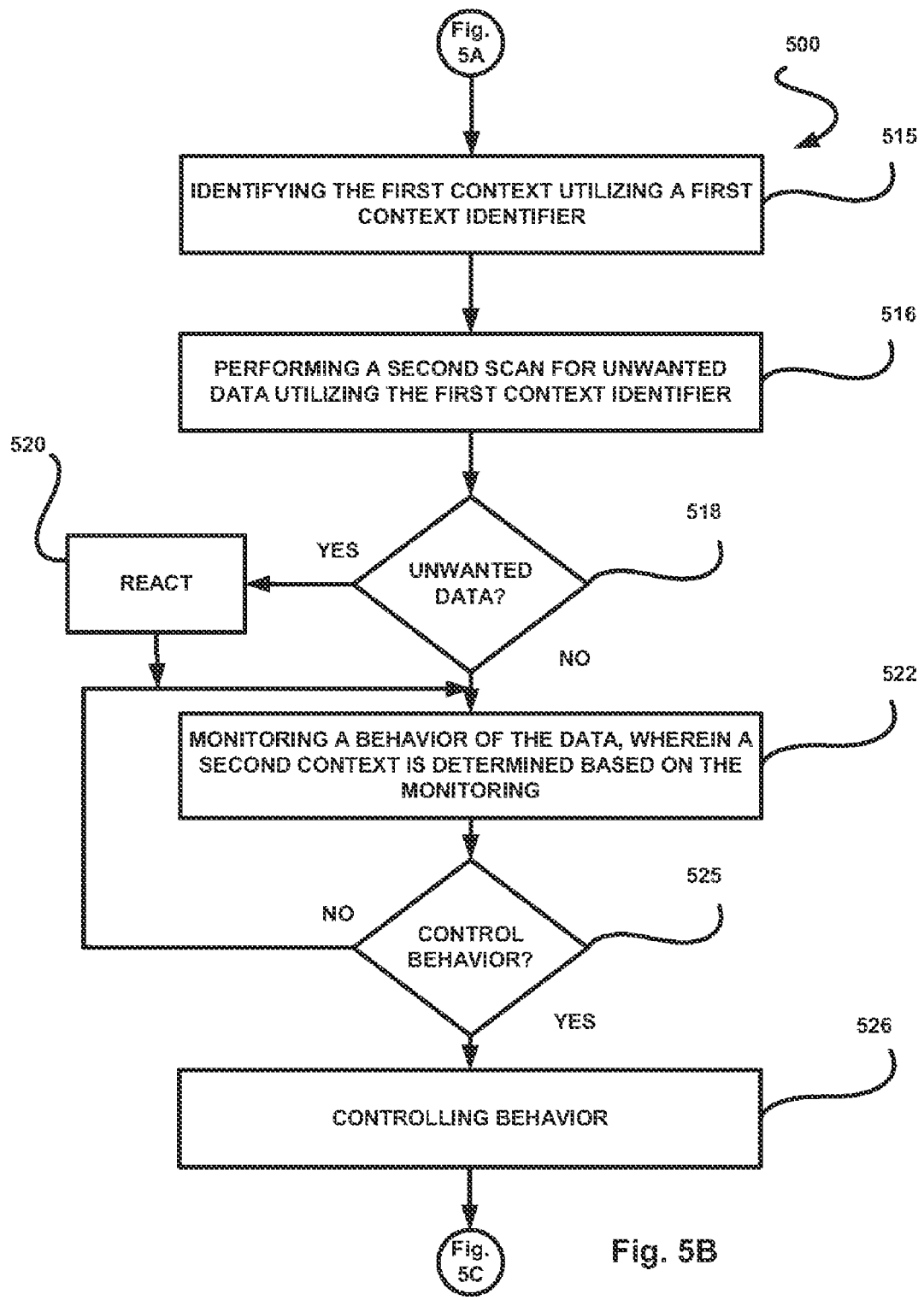
Figure 5C:
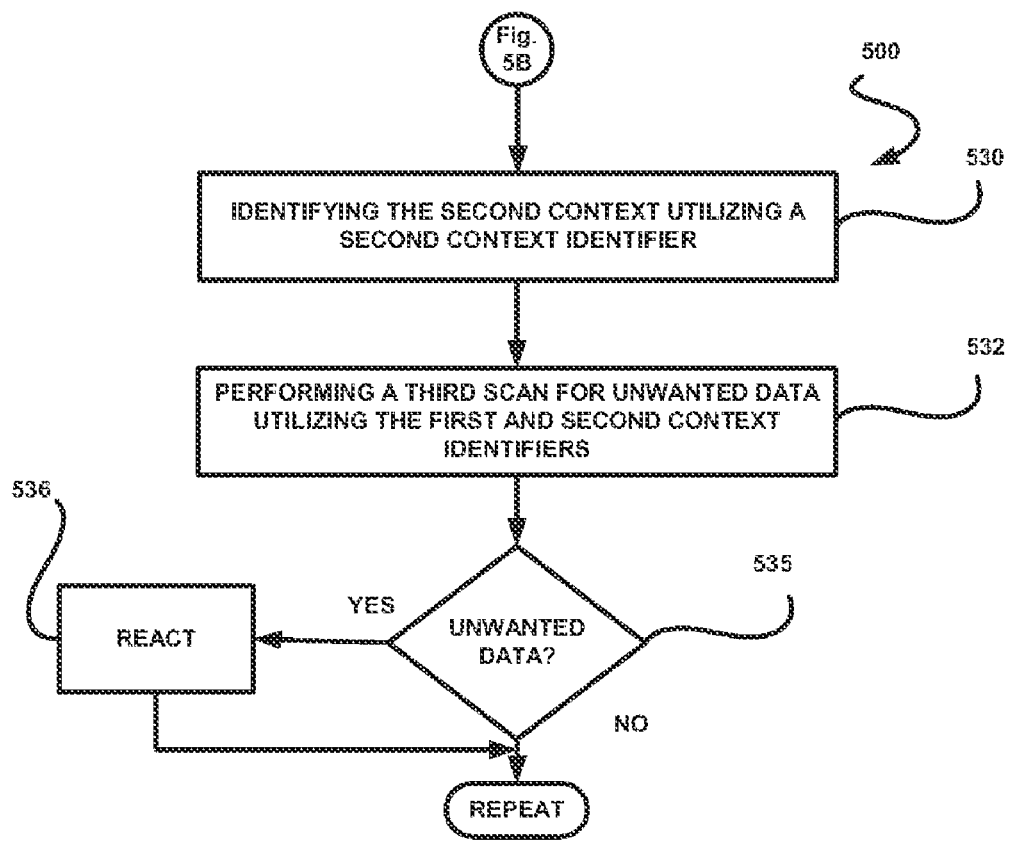

FIGS. 5A-5C illustrate a security method 500 for detecting unwanted data, in accordance with still yet another embodiment. As an option, the present security method 500 may be implemented in the context of the architecture, environment and/or context of FIGS. 1, 2, 3 and/or 4. Of course, however, the security method 500 may be carried out in any desired environment and/or context.

In use, operation of an on-access scanner is provided. With reference first to FIG. 5A, the security method 500 identifies whether data is accessed in operation 502. If data is accessed, a first scan in performed for unwanted data in operation 505. In the event that unwanted data is found during the scan in operation 506, the security method 500 reacts in operation 508. Such reaction may take any form including, but not limited to a quarantine operation, an alert, a cleaning operation, log reporting, etc.

Regardless as to whether unwanted data is found during the first scan in operation 506, the security method 500 continues as set forth below. Specifically, the behavior of the data is monitored in any desired manner. Note operation 510. For example, the behavior may be monitored by running a scan, comparing the behavior against a predetermined set of rules, etc. More information on exemplary rules may be found in application Ser. No. 10/876,524 filed Jun. 24, 2004, and which is incorporated herein by reference for all purposes.

Further during operation 510, a first context is determined based on such monitoring. Such context may be determined in the same manner discussed hereinabove, or in any manner for that matter. While, in the present embodiment, the context is described as being determined in operation 510 et al., it should be understood that the context may be determined in any desired operation so that such context may be used at any point in method 500 for the purpose of improving the detection of unwanted data. For example, a context may be determined in operation 505 for use during decision 506.

Also based on the monitoring, it is decided whether the behavior of the data should be controlled. See decision 512. Optionally, this determination may be made based on whether the behavior monitored in operation 510 matched at least one of the predetermined rules, etc. mentioned above. If the behavior does not need to be controlled, the security method 500 may return to operation 510.

If, however, the behavior is to be controlled per decision 512, such control may include, but is not limited to blocking the behavior, altering the same, etc. Note operation 514. More information on exemplary rules and related behavior controlling techniques may be found in application Ser. No. 10/876, 524 filed Jun. 24, 2004, and which is incorporated herein by reference for all purposes.

Referring now to FIG. 5B, after the behavior is controlled in operation 514, the first context determined in operation 510 is identified utilizing a first context identifier. Note operation 515 in FIG. 5B. It should be understood that the order of operation 515 with respect to the other operations is not critical, as the first context identifier may be identified at any desired, feasible point during security method 500 to more easily identify such specific first context.

Next, in operation 516, a second scan is performed for unwanted data utilizing the first context identifier. This may optionally be carried out in the manner set forth hereinabove. In the event that unwanted data is found during the second scan per decision 518, the security method 500 may react in operation 520 in a manner similar to operations 508.

Regardless of whether unwanted data is found per decision 518, the behavior of the data is monitored such that a second context is determined. See operation 522. Based on such monitoring, it is decided whether the behavior of the data must be controlled in decision 525. If the behavior does not need to be controlled, the security method 500 returns to operation 522, otherwise the behavior is controlled in operation 526. As an option, operations 522-526 may be carried out in a manner similar to operations 510-514 described hereinabove.

Turning now to FIG. 5C, after the behavior is controlled in operation 526, the second context determined in operation 522 is identified using a second context identifier. Note operation 530. Then, a third scan is performed for unwanted data utilizing the first and second context identifiers in operation 532. In the event that unwanted data is found during the third scan per operation 535, the security method 500 may react in operation 536, as described previously.

Next, regardless of whether unwanted data is found per decision 535, the security method 500 may repeat in the spirit of the method 100 of FIG. 4, thereby collecting additional context identifiers for improved detection of unwanted data.

To provide a detailed example of the method 500 of FIGS. 5A-5C, as described above, a specific flow is provided in Table 1 of a security method for detecting unwanted data. It should be noted that such flow is set forth for illustrative purposes only, and should not be construed as limiting in any manner.

TABLE 1

1) User tries to start <CouldBeNasty.exe>
2) On-Access scanner scans CouldBeNasty.exe, the engine decides it is clean and the on-access scanner (OAS) allows CouldBeNasty.exe to run
3) CouldBeNasty.exe writes data to HKLM\Software\Windows\Run
4) Registry monitoring rule triggers and blocks the change, and informs the OAS that it happened; "ContextID=205" is established based on the current context
5) OAS scans CouldBeNasty.exe again, this time including "ContextID=205"; the engine decides again that it is clean
6) CouldBeNasty.exe now opens port 25
7) Network monitoring rule triggers and blocks the attempt to open the port and tells the OAS that it happened; "ContextID=59" is established based on the current context
8) OAS scans CouldBeNasty.exe again, this time including "ContextID=205" and "ContextID=59"; with all this extra information, the engine and signatures decide that this is a "new mass-mailing worm"; the process is terminated, the user informed and a sample is sent to a virus signature service provider (i.e. McAfee ®, etc.) so that an exact signature can be generated In one embodiment, terrorism may be countered utilizing the aforementioned technology. According to the U.S. Federal Bureau of Investigation, cyber-terrorism is any "premeditated, politically motivated attack against information, computer systems, computer programs, and data which results in violence against non-combatant targets by subnational groups or clandestine agents." A cyber-terrorist attack is designed to cause physical violence or extreme financial harm. According to the U.S. Commission of Critical Infrastructure Protection, possible cyber-terrorist targets include the banking industry, military installations, power plants, air traffic control centers, and water systems. Thus, by optionally incorporating the present technology into the cyber-frameworks of the foregoing potential targets, terrorism may be countered by preventing the infection thereof with malware, which may potentially cause extreme financial harm.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method, comprising:
   receiving a request to open a file in a computer;
   scanning the file;
   determining whether unwanted data is present in the file by:
     comparing data in the file with a plurality of signatures representative of certain types of unwanted data;
     evaluating a context associated with the scanning activities using a state machine,
     wherein a context ID is established for the context and associated with the file, the context ID being related to attempts by the file to initiate activities in the computer; and
     detecting additional data, which is unwanted, by monitoring a behavior of data in the computer and determining an additional context, using a state machine, based on the monitoring of the behavior of data; and
   communicating a sample of the file to a virus signature service provider to be used in generating an exact signature that encompasses all of the contexts associated with the file.

2. The method of claim 1, further comprising:
   indicating a presence of the unwanted data based on both the scanning of the file and the evaluating of the context.

3. The method of claim 1, wherein a presence of the unwanted data triggers a selected one of a group of responses, the group consisting of:
   a) a quarantine operation;
   b) an alert;
   c) a cleaning operation for the computer; and
   d) log reporting related to the unwanted data.

4. The method of claim 1, wherein writing of data to a location in the computer triggers a registry monitoring rule that blocks a change at the location.

5. The method of claim 1, wherein opening a port associated with the computer triggers a registry monitoring rule that blocks this activity, and wherein a second context ID is created based on attempting to open the port.

6. The method of claim 5, wherein the file is rescanned in conjunction with evaluating both of the context IDs such that any new activity initiated by the file is terminated.

7. The method of claim 1, wherein the unwanted data comprises malware.

8. An apparatus, comprising:
   a server computer coupled to an end user computer over a network connection, the server computer providing software to the end user computer such that the end user computer is configured for:
     scanning a file received by the end user computer;
     determining whether unwanted data is present in the file by:
       comparing data in the file with a plurality of signatures representative of certain types of unwanted data;
       evaluating a context associated with the scanning activities using a state machine,
       wherein a context ID is established for the context and associated with the file, the context ID being related to attempts by the file to initiate activities in the end user computer; and
       receiving additional data through monitoring of a behavior of data in the computer and through a determination of an additional context, using a state machine, based on the monitoring of the behavior of data; and
     receiving a sample of the file to be used in generating an exact signature that encompasses all of the contexts associated with the file.

9. The apparatus of claim 8, wherein writing of data to a location in the end user computer triggers a registry monitoring rule that blocks a change at the location.

10. The apparatus of claim 8, wherein opening a port associated with the end user computer triggers a registry monitoring rule that blocks this activity, and wherein a second context ID is created based on attempting to open the port.

11. The apparatus of claim 10, wherein the file is rescanned in conjunction with evaluating both of the context IDs such that any new activity initiated by the file is terminated.

12. Logic encoded in non-transitory media that includes code for execution and when executed by a processor operable to perform operations comprising:
   receiving a request to open a file in a computer;
   scanning the file;
   determining whether unwanted data is present in the file by:
     comparing data in the file with a plurality of signatures representative of certain types of unwanted data;
     evaluating a context associated with the scanning activities using a state machine,
     wherein a context ID is established for the context and associated with the file, the context ID being related to attempts by the file to initiate activities in the computer; and
     detecting additional data, which is unwanted, by monitoring a behavior of data in the computer and determining an additional context, using a state machine, based on the monitoring of the behavior of data; and
   communicating a sample of the file to a virus signature service provider to be used in generating an exact signature that encompasses all of the contexts associated with the file.

13. The logic of claim 12, wherein a presence of the unwanted data triggers a selected one of a group of responses, the group consisting of:
   a) a quarantine operation;
   b) an alert;
   c) a cleaning operation for the computer; and
   d) log reporting related to the unwanted data.

14. The logic of claim 12, wherein opening a port associated with the computer triggers a registry monitoring rule that blocks this activity, and wherein a second context ID is created based on attempting to open the port.

15. The logic of claim 14, wherein the file is rescanned in conjunction with evaluating both of the context IDs such that any new activity initiated by the file is terminated.

* * * * *